United States Patent Office 3,342,887
Patented Sept. 19, 1967

3,342,887
PROCESS FOR ALKYLATION OF AROMATICS USING A RHENIUM OXIDE CATALYST
Donald M. Fenton, Anaheim, Calif., assignor to Union Oil Company of California, Los Angeles, Calif., a corporation of California
No Drawing. Filed Nov. 16, 1964, Ser. No. 411,549
10 Claims. (Cl. 260—671)

This invention relates to an alkylation process, and in particular, relates to the alkylation of aromatic compounds in the presence of a rhenium oxide catalyst.

I have discovered that valuable alkylation products can be obtained by reacting in a liquid and/or gaseous phase, at a temperature of about 0° to 550° C., aromatic compounds having at least one replaceable nuclear hydrogen atom with hydrocarbon olefins, having 2 to 30 carbon atoms, in the presence of rhenium oxides reduced to an oxidation state ineffective to oxidize said olefins, whereas in the absence of the rhenium oxides, alkylation does not take place.

My co-pending application Ser. No. 373,878, filed June 9, 1964, discloses the use of higher valence rhenium compounds for the oxidation of olefins. During the oxidation reaction, the rhenium compound is reduced to a lower valent or reduced rhenium oxide and a stoichiometric amount of oxygenated product is produced, i.e., the scission of a single carbon-hydrogen bond per unit change in valence of said rhenium oxide. The reduced rhenium oxide must be regenerated, generally by contacting with oxygen, so that it can be used again for olefin oxidation.

While the aforementioned lower valent rhenium compound is ineffective for the oxidation of olefins, I have now found that it is an effective catalyst for the alkylation or aromatic compounds in the presence of olefins. In general, rhenium compounds that are reduced to an oxidation state ineffective to oxidize olefins are suitable alkylation catalysts, e.g., rhenium dioxide, rhenium trioxide, rhenium sesquioxide.

Rhenium compounds suitable for use as a catalyst can be produced by oxidizing rhenium metal or by reducing higher valence rhenium oxides such as rhenium heptoxide and rhenium salts such as alkali metal, alkaline earth metal and ammonia perrhenates, e.g., sodium perrhenate, potassium perrhenate, calcium perrhenate, ammonia perrhenate, etc., by contacting said rhenium oxides and salts with olefins as disclosed in said co-pending application. Suitable rhenium compounds can also be prepared by hydrolysis of rhenium halides such as rhenium trichloride, rhenium tetrachloride, rhenium hexachloride, rhenium tetrafluoride, rhenium hexafluoride, etc., and rhenium oxyhalides such as rhenium trioxybromide, rhenium oxytetrachloride, rhenium trioxychloride, rhenium oxytetrafluoride, rhenium dioxydifluoride, etc.

Preferably, the aromatic and hydrocarbon olefin are contacted with the rhenium oxides such as rhenium heptoxide under substantially anhydrous conditions. Water can be present; however, and, in particular when using the other indicated rhenium compounds, water in amounts from about 1 to 50 weight percent and preferably from about 5 to 25 weight percent of the reaction media can be used. Preferably, such aqueous reaction medium is acidified with any suitable acid, e.g., a strong mineral acid such as nitric, sulfuric or hydrochloric to lower the liquid pH to between about 1 to 6.5.

The rhenium catalyst can be used in the form of pellets or as a finely divided powder. When the alkylation reactants are in a gaseous phase, the catalyst can be supported on a carrier having extended surfaces. Suitable carriers include any finely divided solid that is inert to the reaction and reactants and that preferably has a large specific surface area. Examples of suitable carriers include the difficultly reducible adsorbent inorganic oxides; for example, silica-gel, alumina-gel, mixtures of silica and alumina, zirconia, titania, magnesia, beryllia, etc. Various natural clays may also be employed after suitable activation by heat and/or acid treatment. Such clays include, for example, kaolin, attapulgite, montmorillonite clays such as bentonite, hectorite, etc. The zeolitic metallo alumino silicates commonly referred to as molecular sieves may also be used. These solids are crystalline composites of alumina and silica and have a uniform pore size from about 4.5 A. to about 13 A. units. Examples of naturally occurring zeolites are chabazite, gnelenite, acadialite, etc. Synthetic molecular sieves are commercially available with a variety of pore sizes in the aforementioned size ranges such as the H, A, X and Y designated molecular sieves.

Alkylatable aromatic compounds that may be used in my process include monocyclic, bicyclic and tricyclic aromatics, containing at least one replaceable nuclear hydrogen atom, such as benzene, naphthalene, anthracene, phenanthrene, etc. Since the alkylation reaction is controlled by the nucleus of the aromatic compounds said aromatics may contain substituents such as alkyl, alkoxy, halogen and hydroxy groups which contain less than about 20 carbon atoms and preferably 1 to 12 carbon atoms. Examples of substituted aromatics that may be used in my process include the following:

alkyl benzenes such as toluene,
O-, m-, and p-xylene,
ethylbenzene,
1,2,3-trimethylbenzene,
1,2,4-trimethylbenzene,
1,2-diethylbenzene,
butylbenzene,
1,2,3-tripropylbenzene,
1,3-dipropylbenzene,
octylbenzene,
dodecylbenzene, etc.;
alkoxybenzenes such as anisole,
o-methoxydiphenyl,
phenetole,
n-propoxybenzene,
butoxybenzene,
p-octyloxybenzene, etc.;
halobenzenes such as fluorobenzene,
p-fluorobromobenzene,
m-fluorotoluene,
chlorobenzene,
o-chlorobromobenzene,
o-chlorodiphenyl,
o-chloroethylbenzene,
p-chlorooctylbenzene,
bromobenzene,
p-bromodiphenyl,
o-tolyl bromide,
phenyl iodide,
m-tolyl iodide, etc.;
hydroxybenzene such as phenol,
o-butoxyphenol,
m-butylphenol,
p-sic-butylphenol,
p-isoamylphenol,
m-propylphenol,
m-phenylphenol, etc.;
alkylnaphthalenes such as 1-methylnaphthalene,
2-methylnaphthalene,
2-propylnaphthalene,
1,4-dimethylnaphthalene,
1,2-diethylnaphthalene,
1,5-dipropylnaphthalene,
1,2,3-trimethylnaphthalene, 1,2,4-tributylnaphthalene, etc.;
alkoxynaphthalenes such as 1-methoxynaphthylene,
dinaphthyl ether,
2-ethoxynaphthylene,
1-octyloxynaphthylene,
2,5-dimethoxynaphthylene,
1,3-dimethoxy-5-ethoxynaphthylene, etc.;
halonaphthalenes such as 1-fluoronaphthalene,
1-fluoro-2-chloronaphthalene,
2-chloro-3-methylnaphthalene,
1-ethyl-4-fluoronaphthalene,
1,3-dimethyl-7-chloronaphthalene,
2-bromonaphthalene,
1-Iodonaphthalene,
1-butyl-7-bromonaphthalene,
1,5-dichloronaphthalene, etc.;
hydroxynaphthalenes such as 1-naphthol,
1,4-dihydroxynaphthalene,
1-butyl-5-hydroxynaphthylene,
1,3,5-trihydroxynaphthalene, etc.;
alkyl anthracenes such as 2-methylanthracene,
1-methylanthracene,
3-ethylanthracene,
2-hexylanthracene,
9,10-dimethylanthracene,
1,2-diethylanthracene,
9,10-dipropylanthracene,
3-octylanthracene, etc.;
alkoxyanthracenes such as 1-ethoxyanthracene,
1,8-dipropoxyanthracene,
1,2,7-trimethoxyanthracene,
2-butoxyanthracene,
1,5-dimethyl-3-ethoxyanthracene, etc.;
haloanthracenes such as 2-fluoroanthracene,
3,5-difluoroanthracene,
1-chloroanthracene,
2-chloromethylanthracene,
3-bromoanthracene,
1-butyl-6-bromoanthracene,
1,3-dibromanthracene,
4-Iodoanthracene, etc.;
hydroxyanthracenes such as 1,3-dianthranol,
3-anthranol,
1,3-dimethyl-5-hydroxyanthracene,
1,3-dihydroxyanthracene, etc.;
alkyl phenanthrenes such as 1-methylphenanthrene,
2-ethylphenanthrene,
1,2-dibutylphenanthrene, etc.;
alkoxyphenanthrenes such as 1-butoxyphenanthrene,
2,4-dimethoxyphenanthrene, etc.;
halophenanthrenes such as 1-fluorophenanthrene,
2,4-difluorophenanthrene,
3-chlorophenanthrene, etc.;
and hydroxyphenanthrenes such as 1-hydroxyphenanthrene,
1,3-dihydroxyphenanthrene, etc.

Olefins that can be used as the alkylating agent are branched or straight chain unsaturated acylic olefins having one or more double bonds. Low molecular weight olefins that are gaseous at ambient temperature and pressure such as ethylene, propylene, 1-butene, 2-butene, etc. can be used as well as olefins that are normally liquid such as n-pentene, 2-propylhexene-1, heptene, 4,4-dimethyl-nonene-1, octene, 1-nonene, iso-decylene, dodecene, 1-tetradecene, 4-propyldecene-1, heptadecene, iso-octadecene, docosene, tetracosene, hexacosene, octacosene, triacontene, eicosene, etc. Preferably, the olefins should contain 8 to 30 carbon atoms and most preferably 2 to 20 carbon atoms. Relatively pure olefins can be used to simplify the product recovery steps; however, it is also within the scope of my invention to use mixtures of olefins. Olefins are contacted with aromatic compounds according to my invention in a ratio of about 50 to 1.0 to about 1.0 to 50 (olefin to aromatic) and preferably, 10 to 1.0 to about 1.0 to 10.

An organic liquid inert to the reaction and reactants can be used as a reaction medium in my process when liquid phase conditions are employed. Preferably such organic liquid is a solvent for the reactants and the rhenium compound. In general, any organic compound that is a liquid and which is inert under the reaction conditions and chemically non-reactive with the aromatic and olefin can be used. Examples of suitable solvents are: aliphatic hydrocarbons such as hexane, heptane, iso-octane, nonane, decane, cyclohexane, methylcyclohexane, etc.; halogenated hydrocarbons such as carbon tetrachloride, n-butyl bromide, iso-amyl bromide, iso-amyl chloride, trichloropropane, pentachloroethane, ethyl chloride, ethyl bromide, iso-butyl chloride, etc.; esters such as methyl acetate, ethyl acetate, dimethyl phthalate, ethyl propionate, n-propyl acetate, n-butyl formate, sec-butyl acetate, iso-butyl acetate, ethyl butyrate, iso-amylacetate, cyclohexyl acetate, etc.; and amides such as N,N-dimethyl formamide, N,N-dimethyl acetamide, formamide, etc.

The temperature at which the alkylation process of this invention can be conducted is dependent upon the charging stock employed. However, the alkylation reaction is generally carried out at a temperature of about 0° C. to about 550° C. and preferably at a temperature of about 25° C. to 250° C. Pressure aids the alkylation reaction and consequently this process is preferably carried out at superatmospheric pressures. Generally pressures of about 1 atmosphere to about 1,000 atmospheres are used with the preferred range being 1 to 1,000 p.s.i.

The process of this invention may be carried out in a discontinuous operation by contacting in a liquid reaction medium aromatic compounds containing at least one replaceable nuclear hydrogen atom with an olefin in the presence of a suitable rhenium oxide catalyst. The reaction medium is stirred with conventional stirring means while being maintained at alkylation temperatures. After completion of the reaction, alkylation products are recovered by conventional separation means such as distillation. It is preferred, however, to use a continuous alkylation process. This may be accomplished by passing aromatic compounds having at least one replaceable nuclear hydrogen atom and olefins in a liquid and/or gaseous phase through a reaction zone maintained at alkylation conditions and which contains as a fixed bed, rhenium oxide catalyst having a particle size of about 1/16 inch to 1/2 inch in diameter. The resulting alkylation product is recovered from the reactor effluent and any unreacted alkylatable compound and olefin may be recycled to the reaction zone.

A fluidized catalyst bed may also be employed in my invention. In this method of operation, a charging stock comprising alkylatable aromatics and olefins in a gaseous phase are passed upwardly through a bed of finely divided rhenium oxide catalyst having a particle size of about 5 microns to 400 microns, causing the catalyst particles to become set in motion and form a fluid-like mass. Another mode of operation which may be employed is a moving catalyst bed which comprises continuously passing a compact bed of catalyst through an alkylation reaction zone either concurrently or countercurrently to incoming alkylation reactants. The catalyst is then passed into a cooling zone from which it may return to the reaction zone.

The following examples will illustrate the mode of practice of my invention and will demonstrate the results obtainable thereby. All parts expressed herein are on a weight basis.

EXAMPLE I

A three hundred milliliter autoclave was charged with 50 parts benzene, 11 parts propylene and 2 parts rhenium heptoxide. The rhenium heptoxide was reduced to an oxidation state ineffective to oxidize the propylene by heating the reaction mixture to 100° C. and oxidizing a stoichiometric of propylene. Thereafter, the reactants were maintained at 100° C. for three hours. The products of reaction were determined by gas-liquid chromatography to be 11 parts isopropylbenzene and 4 parts di-isopropyl benzene. When the experiment was repeated in the absence of any rhenium catalyst, no reaction occurred.

EXAMPLE II

The procedure of Example I was repeated with the exception that toluene was used as the aromatic compound in place of benzene. The reaction product contained a mixture of methylisopropylbenzenes.

EXAMPLE III

A 300 ml. autoclave was charged with 100 parts benzene, 32 parts propylene and 5 parts rhenium trioxide. The reactants were maintained at 125° C. for four hours and the resultant reaction products consisted of four parts of isopropylbenzene and 1 part of more highly substituted benzenes.

EXAMPLE IV

A 300 ml. autoclave was charged with 50 parts naphthalene, 75 parts n-heptane, 33 parts propylene and 2 parts rhenium heptoxide. The rhenium heptoxide was reduced to an oxidation state ineffective to oxidize propylene by heating the reaction mixture to 125° C. Thereafter, the reactants were maintained at this temperature for 6 hours. The reaction mixture was then distilled and the product of reaction was determined to be a mixture of isopropylnaphthalenes.

EXAMPLE V

The procedure of Example IV was repeated with the exception that 1-butene was used as the olefin instead of propylene. The product of reaction contained isobutylnaphthalenes.

EXAMPLE VI

A 300 ml. autoclave was charged with 50 parts anthracene, 50 parts n-heptane, 41 parts propylene and 5 parts rhenium heptoxide. The rhenium heptoxide was reduced to an oxidation state ineffective to oxidize propylene by heating the reaction mixture to 180° C. Thereafter, the reactants were maintained at this temperature for a period of 4 hours. Infrared analysis of the products indicated the presence of isopropylanthracenes.

EXAMPLE VII

The procedure of Example VI was repeated with the exception that phenanthrene was used as the aromatic in place of anthracene. Infrared analysis of the product indicated the presence of isopropylphenanthrenes.

EXAMPLE VIII 300 ml. autoclave was charged with 100 parts chlorobenzene, 37 parts propylene and 5 parts rhenium heptoxide. The rhenium heptoxide was reduced to an oxidation state ineffective to oxidize propylene by heating the reaction mixture to 150° C. Thereafter, the reactants were maintained at this temperature for a period of six hours. Gas-liquid chromatography of the product indicated the presence of a mixture of chloroiso-propylbenzenes.

EXAMPLE IX

The procedure of Example VIII was repeated with the exception that phenol was used as the aromatic compound in place of chlorobenzene. Gas-liquid chromatography of the product indicated the presence of hydroxyisopropylbenzenes.

EXAMPLE X

The procedure of Example VIII was repeated with the exception that anisole was used as the aromatic compound instead of chlorobenzene. Gas-liquid chromatography indicated the presence of methoxyisopropylbenzenes.

The preceding examples are intended solely to illustrate the practice of my invention and to demonstrate results secured thereby. The examples are not intended to unduly limit the invention which is intended to be defined only by the steps and reagents, and their obvious equivalents, set forth in the following claims.

I claim:

1. An alkylation process which comprises contacting, at a temperature of 0° to 550° C., a compound having an aromatic nucleus, at least one replaceable nuclear hydrogen atom and selected from the group consisting of monocyclic, bicyclic and tricyclic aromatic nuclei and alkyl, alkoxy, halogen and hydroxy derivatives thereof, said alkyl and alkoxy derivatives having 1 to 20 carbon atoms, and hydrocarbon olefins having 2 to 20 carbon atoms with rhenium oxide reduced to an oxidation state ineffective to oxidize olefins.

2. The method of claim 1 wherein said aromatic nucleus is benzene.

3. The method of claim 1 wherein said aromatic nucleus is naphthalene.

4. The method of claim 1 wherein said aromatic nucleus is anthracene.

5. The method of claim 1 wherein said aromatic nucleus is phenanthrene.

6. The method of claim 1 wherein said hydrocarbon olefin is ethylene.

7. The method of claim 1 wherein said hydrocarbon olefin is propylene.

8. The method of claim 1 wherein said rhenium oxide is rhenium dioxide.

9. An alkylation process which comprises contacting, at a temperature of 0° to 550° C., a compound having an aromatic nucleus and at least one replaceable nuclear hydrogen atom, selected from the group consisting of monocyclic, bicyclic and tricyclic nuclei and alkyl, alkoxy, halogen and hydroxy derivatives thereof, said alkyl and alkoxy derivatives having 1 to 20 carbon atoms, and hydrocarbon olefins having 2 to 20 carbon atoms with water and a perrhenate selected from the group consisting of alkali metal, alkaline earth metal and ammonia perrhenates to produce a catalytically active rhenium oxide and incur oxidation of a stoichiometric amount of said olefins, and thereafter continuing said contacting of said compound having an aromatic nucleus, hydrocarbon olefin and rhenium oxide to effect alkylation of said compound having an aromatic nucleus.

10. The method of claim 9 wherein the perrhenate is sodium perrhenate.

No references cited.

DELBERT E. GANTZ, *Primary Examiner.*

C. R. DAVIS, *Assistant Examiner.*